(12) United States Patent
Cadieux et al.

(10) Patent No.: US 6,259,169 B1
(45) Date of Patent: Jul. 10, 2001

(54) FLEXIBLE ALARM BYPASS MODULE FOR A VEHICLE

(75) Inventors: Jocelyn A. Cadieux, Alexandria; Kenneth L. Nelson, Sterling; Mark Gottlieb, Fairfax Station, all of VA (US)

(73) Assignee: Designtech International, Inc., Springfield, VA (US)

( * ) Notice: Subject to any disclaimer, the term of this patent is extended or adjusted under 35 U.S.C. 154(b) by 0 days.

(21) Appl. No.: 09/412,602

(22) Filed: Oct. 6, 1999

(51) Int. Cl.$^7$ .................................................. B60R 22/00

(52) U.S. Cl. ........................................ 307/10.6; 307/10.1

(58) Field of Search ................................ 307/9.1, 10.1, 307/10.6; 341/154; 318/663; 62/126; 330/66.28

(56) References Cited

U.S. PATENT DOCUMENTS

| | | | |
|---|---|---|---|
| 3,769,606 | * 10/1973 | Henegar | 330/66 |
| 4,048,576 | * 9/1977 | Blackburn et al. | 330/29 |
| 4,313,308 | * 2/1982 | Broatgis et al. | 62/126 |
| 4,484,122 | * 11/1984 | Day et al. | 318/663 |
| 5,648,780 | * 7/1997 | Neidorff | 341/154 |

* cited by examiner

Primary Examiner—Josie A Ballato
Assistant Examiner—Sharon Polk
(74) Attorney, Agent, or Firm—Oblon, Spivak, McClelland, Maier & Neustadt, P.C.

(57) ABSTRACT

A vehicle alarm bypass module which may be used as a part of an installation module for a remote vehicle starter. The alarm bypass module includes a plurality of resistors and a first plurality of switches connected configured to respectively short out respective of the plurality of resistors. Further, a plurality of relays are configured to selectively connect the plurality of resistors into a circuit path. A variable resistance may further be provided in series with the plurality of resistors and a second plurality of switches may be provided to selectively connect the plurality of relays into and out of the circuit path. A multiturn coil may also be provided and may be configured to generate a magnetic field and to be selectively connected into and out of the circuit path based on the setting of the second plurality of switches. With such a structure, the alarm bypass module is flexible in the connection of its circuit components. As a result, an operator can alter the configuration of the alarm bypass module by simply altering the positioning of the switches. The different configurations which the alarm bypass module can take on allow installation into vehicles which include different vehicle alarm systems.

4 Claims, 1 Drawing Sheet

FLEXIBLE ALARM BYPASS MODULE FOR A VEHICLE

BACKGROUND OF THE INVENTION

1. Field of the Invention

The present invention is directed to a flexible alarm bypass module for a vehicle which may find particular application when installing an after-market product, such as a remote vehicle starter, into a vehicle which includes a vehicle alarm system.

2. Discussion of the Background

After-market remote vehicle starters are products which have been on the market for several years. A remote vehicle starter allows a vehicle operator to push a button on a key-chain transmitter to remotely start the vehicle from a few hundred feet away. Such remote vehicle starters are particularly convenient as they allow a vehicle to be turned on, and thereby a heater or air conditioner in the vehicle to be turned on, prior to the operator reaching the vehicle.

However, such after-market remote vehicle starters require the installer to mount and wire up a receiver module/controller under the dash of the vehicle. Such an installation may be troublesome in certain cases.

Particularly, vehicle alarms (security systems) are becoming more and more prevalent in newer vehicles as original manufacturer equipment (OEM). Such vehicle alarms significantly complicate an installation of an after-market remote vehicle starter. Such vehicle alarms become a problem because a remote vehicle starter starts the vehicle without having the key in the ignition, or without taking other steps which the vehicle alarms typically monitor to determine whether the vehicle is being tampered with. Manufacturers of remote vehicle starters typically publish "tech tips" for many different types of vehicles to show how to temporarily bypass the vehicle alarm system when the remote vehicle starter starts up, to avoid setting off the vehicle alarm when the vehicle is started or to allow the vehicle to be started remotely.

There are several types of vehicle alarm systems currently being used by different vehicle manufacturers. Some vehicle alarm systems utilize resistors in the vehicle key which the alarm system detects. Some other vehicle alarm systems utilize a transponder in a vehicle key head, such that the transponder communicates with the vehicle alarm system to indicate to the vehicle alarm system that the proper key is being utilized in the vehicle ignition. Even within each of those different types of vehicle alarm systems, there are different variations between different vehicle manufacturers.

As a result of the variety of vehicle alarm systems currently implemented, a purchaser or an installer of an after-market remote vehicle starter requires many circuits, including a variety of resistors and relays, to get around those types of vehicle alarm systems. The number of connections required to make each type of remote vehicle starting system work in conjunction with the vehicle alarm system can become significantly complicated.

One manner of addressing the above-noted problem is to provide separate installation modules for the remote vehicle starters geared toward each type of vehicle alarm system. The drawback with such a system is that it requires the manufacturing and inventorying of a large number of different modules which may have to take into consideration not only the different types of vehicle alarm systems, but also possibly variations within each type from the different vehicle manufacturers.

SUMMARY OF THE INVENTION

Accordingly, one object of the present invention is to provide a novel alarm bypass module for a remote vehicle starter which simplifies the installation of the remote vehicle starter.

A more specific object of the present invention is to provide a novel alarm bypass module for a remote vehicle starter which can overcome the above-discussed drawbacks in the background art.

A more specific object of the present invention is to provide a novel alarm bypass module for a remote vehicle starter which can be utilized with a plurality of different vehicle alarm systems in a simple and efficient manner.

To achieve the above-noted and other objects, the present invention sets forth a novel vehicle alarm bypass module which may be used as a part of an installation module for a remote vehicle starter. The alarm bypass module of the present invention includes a plurality of resistors and a first plurality of switches connected which can respectively short out respective of the plurality of resistors. Further, a plurality of relays are configured to selectively connect the plurality of resistors into a circuit path. A variable resistance may further be provided in series with the plurality of resistors and a second plurality of switches may be provided to selectively connect the plurality of relays into and out of the circuit path. A multiturn coil may also be provided and may be configured to generate a magnetic field and to be selectively connected into and out of the circuit path based on the setting of the second plurality of switches. With such a structure in the present invention, the alarm bypass module is flexible in the connection of its circuit components. As a result, an operator can alter the configuration of the alarm bypass module by simply altering the positioning of the switches. The different configurations which the alarm bypass module can take on allow installation into vehicles which include different vehicle alarm systems.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
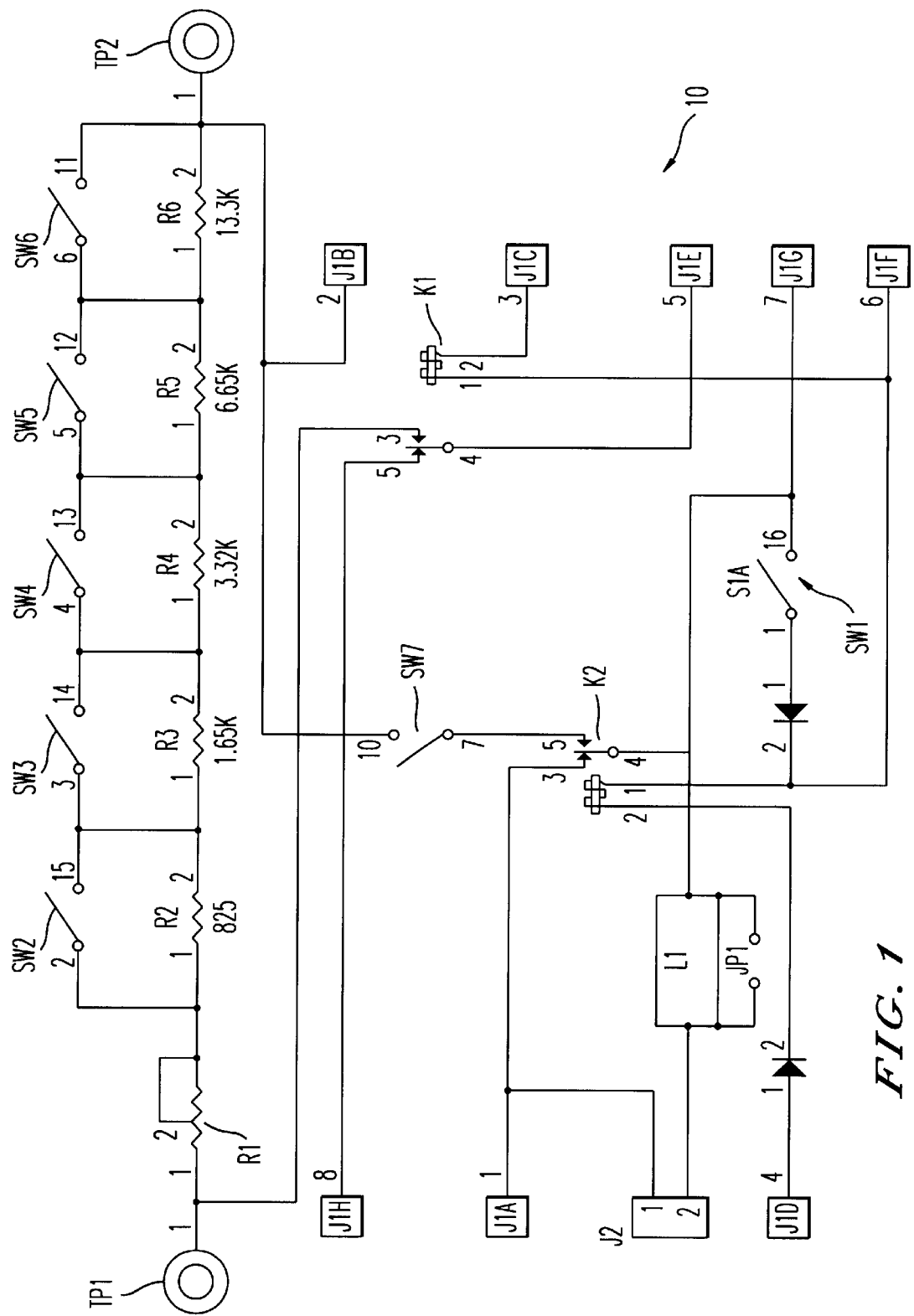
FIG. 1 shows a circuit diagram of the novel flexible vehicle alarm bypass module of the present invention.

As a general description, the present invention is directed to a flexible vehicle alarm bypass module which can be utilized in a remote vehicle starting system. The flexible vehicle alarm bypass module of the present invention may form a part of the installed module of a remote vehicle starter. The flexible vehicle alarm bypass module of the present invention is designed to handle different vehicle alarm systems by including a certain number of components with variable connections to change the configuration of the circuitry within the flexible vehicle alarm bypass module. Thus, the flexible vehicle alarm bypass module of the present invention can be varied based on the type of vehicle alarm system utilized in the vehicle into which the, e.g., remote vehicle starter is to be installed.

FIG. 1 shows the circuit diagram of the flexible vehicle alarm bypass module 10 of the present invention.

One feature of the present invention is to allow the configuration within the flexible vehicle alarm bypass module to be easily changed. To achieve that operation, the present invention utilizes 7 dip-type switches SW1–SW7 in the alarm bypass module 10. The switches SW1 and SW7 control the routing of different connections needed for different styles of alarms, and the remaining 5 switches SW2–SW6 are used to select a specific resistance value needed to match that of the factory alarm resistor in the key (or in the ignition switch) for some vehicle alarm types.

Even more particularly, as discussed above certain types of vehicle alarm systems utilize resistors in their vehicle keys to determine whether the vehicle is being started by an authorized operator. For a remote vehicle starter to properly be utilized in a vehicle having such a type of alarm system, the resistance provided by the vehicle key must be replicated when the remote vehicle starter is remotely starting the vehicle. To achieve such a structure in the present invention, the flexible vehicle alarm bypass module 10 shown in FIG. 1 includes the different resistors R1–R6 connected in series. Further, each of the respective switches SW2–SW6 are connected across the respective resistors R2–R6 to effectively connect or short out the respective resistances R2–R6.

Further, the values of the resistances R2–R6 can vary to aid in the flexibility of providing a desired resistance in the flexible vehicle alarm bypass module 10. As a specific example, the resistances R2–R6 can take on the following values: R2=825 ohms; R3=1.65 Kohms; R4=3.32 Kohms; R5=6.65 Kohms; and R6=13.3 Kohms. The resistance R1 can be a variable 1 Kohm resistance. With such a structure in the present invention, if each of the switches SW2–SW6 is opened so that each of resistances R1–R6 are connected in series, a total resistance value of approximately 25 Kohms can be achieved. By selectively shorting out the resistances R2–R6 by closing the switches SW2–SW6, resistances in the range of 0 to 24 Kohms in approximately 825 ohm steps can be achieved.

If the sum of the resistances achieved by opening and closing the switches SW2–SW6 is just below a desired resistance value, the multi-turn variable resistor R1 can be adjusted to obtain the exact desired resistance value.

The flexible vehicle alarm bypass module 10 shown in FIG. 1 also includes 2 probe points TP1 and TP2 at which an installer can measure the resistance of the vehicle alarm bypass module 10 by utilizing an ohmmeter. That allows precise changing of the variable resistance R1 so that an exact desired resistance can be obtained.

The present invention also includes the switches SW1 and SW7. Those switches SW1 and SW7 also control the setting of various circuit elements in the flexible vehicle alarm bypass module 10. Specifically, the switches SW1, SW7 control the relays K1 and K2. The relays K1 and K2 are engaged to place the resistances in a measurement path of the vehicle alarm system to simulate the presence of the key. That is, the switches SW1, SW7 determine when the resistances R1–R6 are in the current path, which must be only when the vehicle is being remotely started. The installer sets the switches SW1–SW7. The remote vehicle starter then triggers the unit, i.e. the relays K1 and K2, which then determine, depending on how the switches SW1–SW7 have been set, which paths are opened or closed. The resistances R1–R6 must also be shorted out after the vehicle is remotely started. This is also the case since not all vehicle alarm systems place a resistance in a key to determine whether the vehicle is being properly started, and thus resistances R1–R6 may be unneeded.

Certain types of vehicle alarm systems rely on inductively coupled transponders in a key head to determine whether the vehicle is being properly started. In that type of system it is not necessary to simulate a resistance of a key, and thus resistors R1–R6 are not needed, and in that situation the switch SW7 remains open.

In that type of vehicle alarm system utilizing an inductively coupled transponder, the vehicle "illuminates" the key with a low frequency radio signal. That low frequency radio signal is distorted in a particular way by the transponder in the key head which identifies the key when the distorted signal is picked up by a sensor within the vehicle.

A further feature of the present invention is to allow the flexible vehicle alarm bypass module 10 of the present invention to be utilized with such a system by conditionally coupling another transponder in the flexible vehicle alarm bypass module 10 when and only when the remote control unit is attempting to start the vehicle.

To accomplish such an operation, the flexible vehicle alarm bypass module 10 includes a multiturn coil L1 etched onto a surface of a printed circuit board. The multiturn coil L1 produces a quadrapolar magnetic field that couples efficiently to the transponder. In this circumstance, the key transponder (not shown) is attached to the printed circuit board. That can be accomplished by the vehicle operator providing a spare key with the transponder and physically mounting, e.g., gluing, the key with the transponder onto the printed circuit board containing the multiturn coil 1. Thus, the transponder (not shown) can be laid on the printed circuit board over the coil L1 and glued in place. The transponder could also be glued at a position on the underside of a casing for the flexible vehicle alarm bypass module 10 from the outside which corresponds to the same location as the coil L1 on the printed circuit board. A coupling coil (not shown) is also installed near the vehicle ignition switch which transfers a radio signal to and from the flexible vehicle alarm bypass module 10. The coupling multiturn coil L1 is conditionally connected by the relays K1 and K2 so that the key image can be made to appear when the vehicle is being remotely started, and to disappear at other times.

Even more particularly, the switches SW1 and SW7 control whether the multiturn coil L1 is utilized in the circuitry in the flexible vehicle alarm bypass module circuitry 10. When the switch S1 is closed the multiturn coil L1 becomes a part of the circuit, and inversely when the switch S1 is opened the multiturn coil L1 is not a part of the circuit.

By utilizing a flexible vehicle alarm bypass module 10 such as in the present invention as shown in FIG. 1, the simple setting of certain switches SW1–SW7 can adapt the flexible vehicle alarm bypass module 10 to operate with different types of vehicle alarm systems. Such a flexible vehicle alarm bypass module 10 is thus simple to install by an installer of remote vehicle systems, and can be used with a plurality of different types of vehicle alarm systems.

Obviously, numerous modifications and variations of the present invention are possible in light of the above teachings. It is therefore to be understood that within the scope of the appended claims, the present invention may be practiced otherwise than as specifically described herein.

What is claimed is:

1. An alarm bypass module, comprising:
   a plurality of resistors;
   a first plurality of switches connected to the plurality of resistors to short out respective of the plurality of resistors;
   a plurality of relays connected to the plurality of resistors to selectively connect the plurality of resistors into a circuit path;

a second plurality of switches connected to the plurality of relays to selectively connect the plurality of relays into and out of the circuit path; and a multiturn coil configured to generate a magnetic field and to be selectively connected into and out of the circuit path based on a setting of the second plurality of switches.

2. An alarm bypass module according to claim 1, further comprising a variable resistance in series with the plurality of resistors.

3. An alarm bypass module, comprising:

a plurality of resistance means for providing an electrical resistance;

a first plurality of switch means for shorting out respective of the plurality of resistance means;

a plurality of relay means for selectively connecting the plurality of resistance means into a circuit path;

a second plurality of switch means for selectively connecting the plurality of relay means into and out of the circuit path;

an inductive coupling means for being selectively connected into and out of the circuit path based on a setting of the second plurality of switch means.

4. An alarm bypass module according to claim 3, further comprising a variable resistance means for providing a variable electrical resistance in series with the plurality of resistance means.

* * * * *